United States Patent
Richards

[15] 3,700,108
[45] Oct. 24, 1972

[54] OIL SKIMMER

[72] Inventor: Frank A. Richards, 11 Martha Drive, Bowmansville, N.Y. 14026

[22] Filed: Feb. 4, 1971

[21] Appl. No.: 112,598

[52] U.S. Cl. ............................210/242, 210/DIG. 21
[51] Int. Cl. ..............................................C02b 9/02
[58] Field of Search..................210/83, 242, DIG. 21

[56] References Cited

UNITED STATES PATENTS

| | | | |
|---|---|---|---|
| 3,608,727 | 9/1971 | Grutsch | 210/DIG. 21 |
| 3,348,690 | 10/1967 | Cornelissen | 210/DIG. 21 |
| 3,613,891 | 10/1971 | Cloutier | 210/242 |
| 3,617,555 | 11/1971 | Ginsburgh | 210/DIG. 21 |
| 3,539,048 | 11/1970 | Pearson | 210/242 |
| 3,403,098 | 9/1968 | Hirs | 210/DIG. 21 |
| 2,876,903 | 3/1959 | Lee | 210/DIG. 21 |

Primary Examiner—Reuben Friedman
Assistant Examiner—T. A. Granger
Attorney—Bean & Bean

[57] ABSTRACT

A float supported unit for removing oil films, debris or other floating liquid and/or solid impurities from the surface of a body of water including an impurity-water conveyor, a perforated, separator-conveyor for separating solid impurity components from the conveyed impurities and water, and a holding tank for thereafter gravity separating water from the liquid impurity components. The impurity-water conveyor is pivotally supported at its upper-outlet end adjacent a fore-aft mid-point of the float support and has its lower-intake end independently float-supported to rise and fall in conformity with the surface of the water adjacent the fore end of the float support. The impurity-water conveyor includes a plurality of relatively flexible paddle elements, which cooperate to elevate separate charges of impurities-water upwardly along a channel guide; each charge being formed and subsequently conveyed and separated with a minimum of emulsion inducing agitation, whereby to promote relatively rapid separation of the liquid impurity components from the water in the holding tank.

6 Claims, 9 Drawing Figures

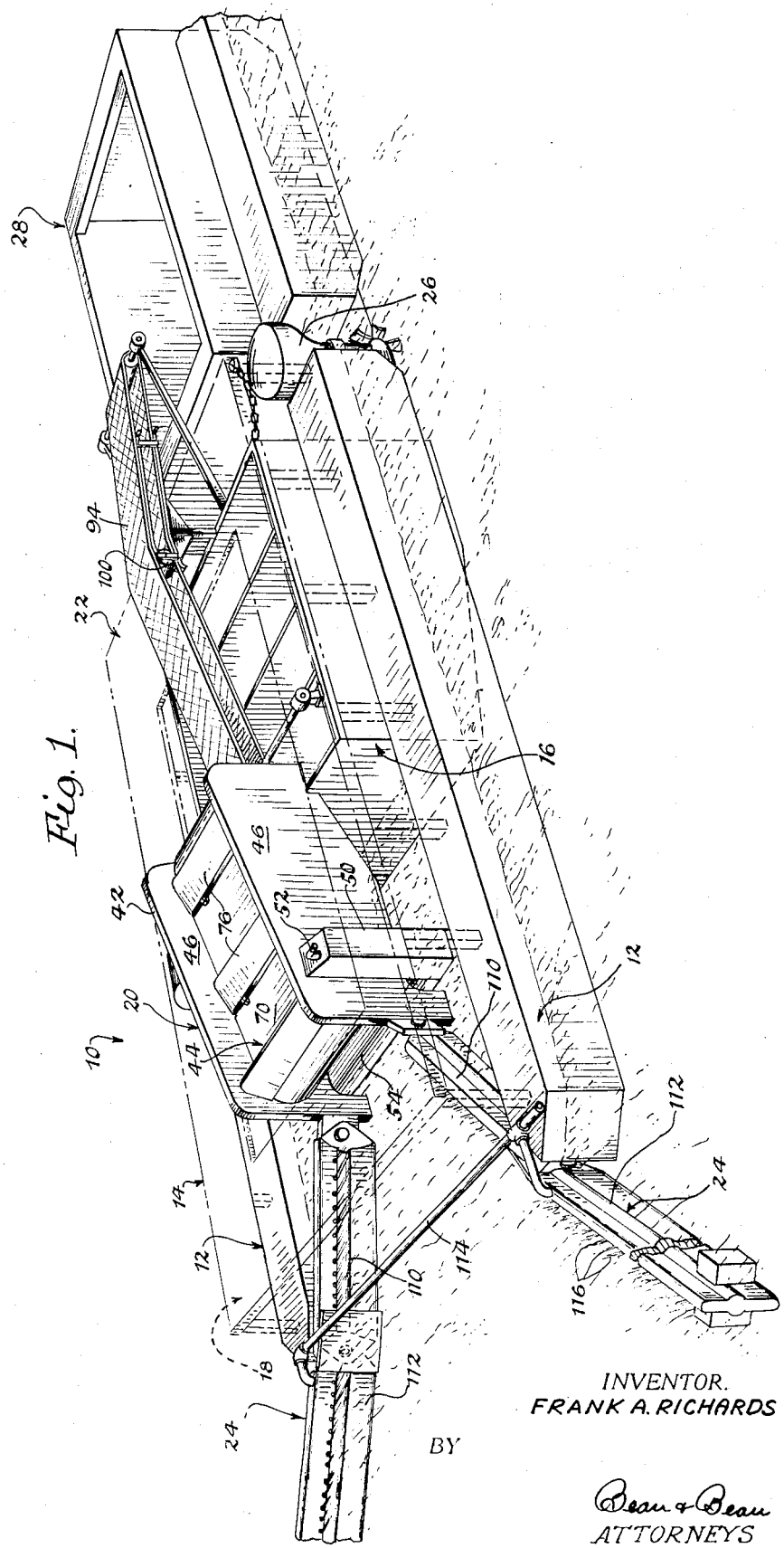

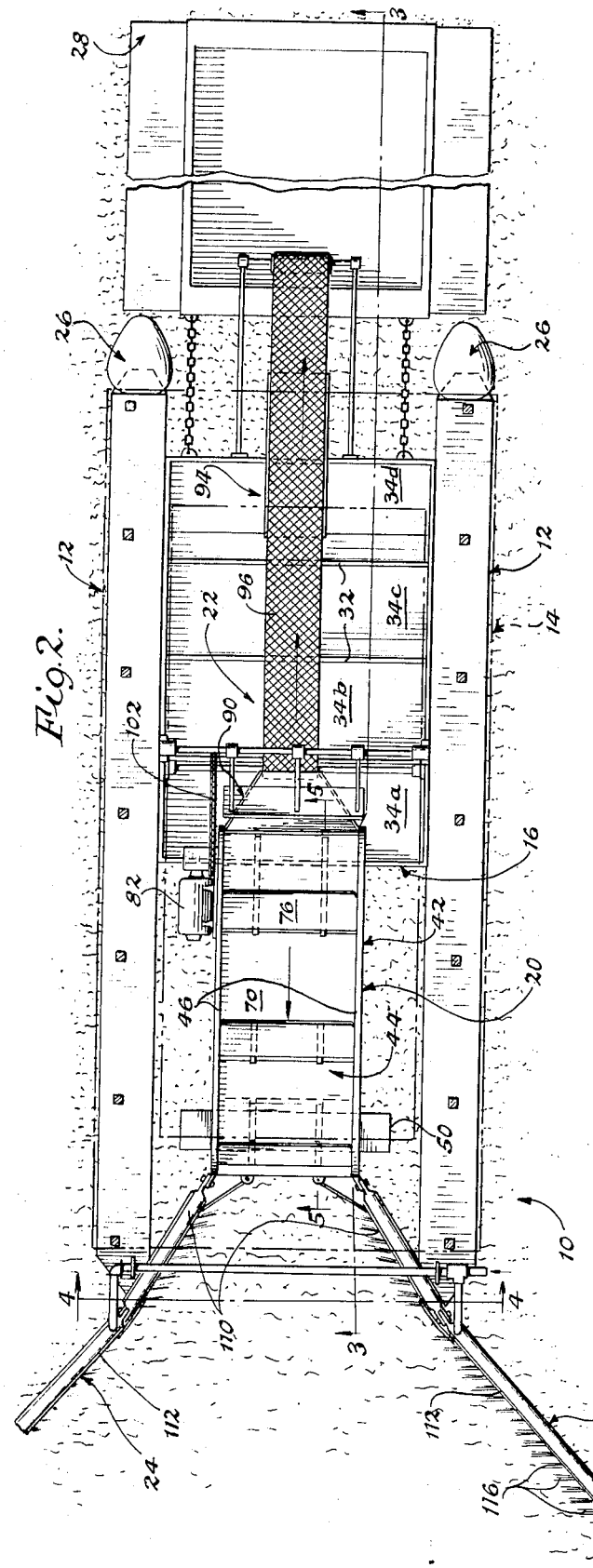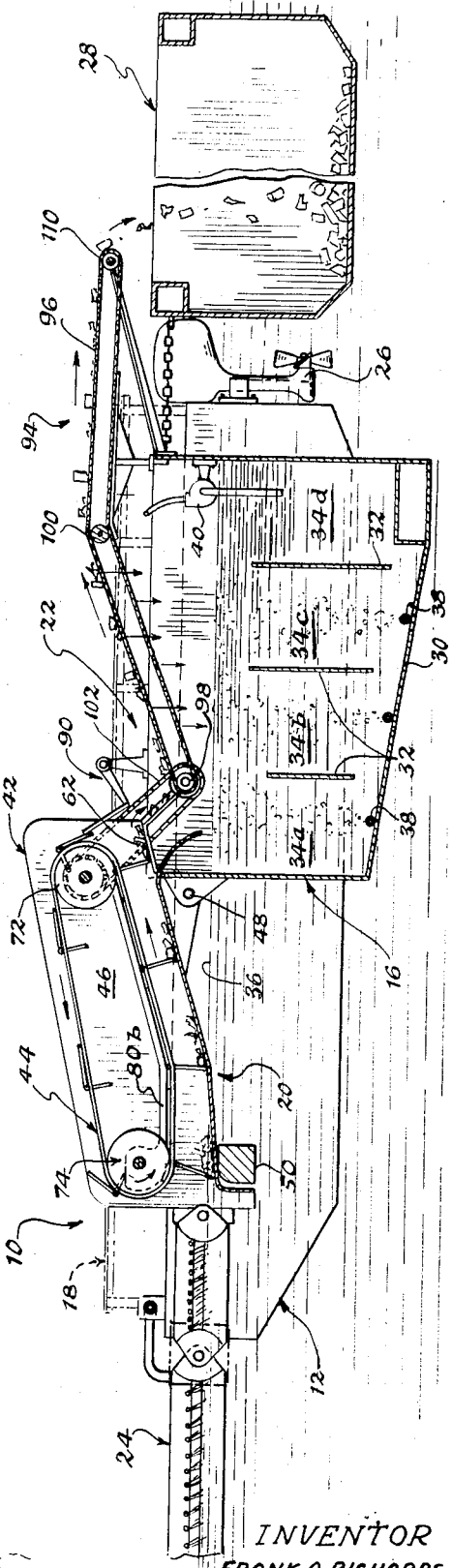

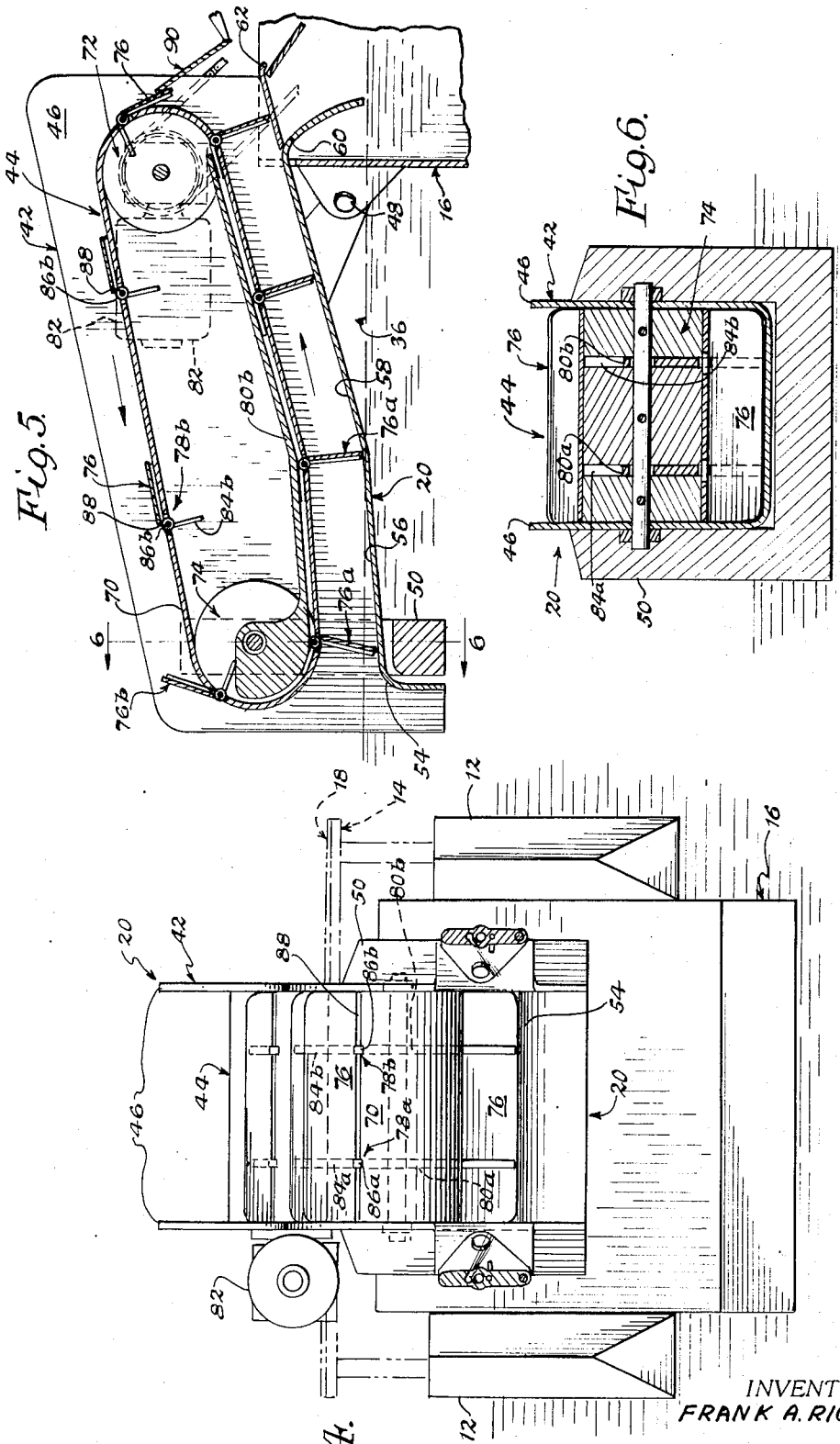

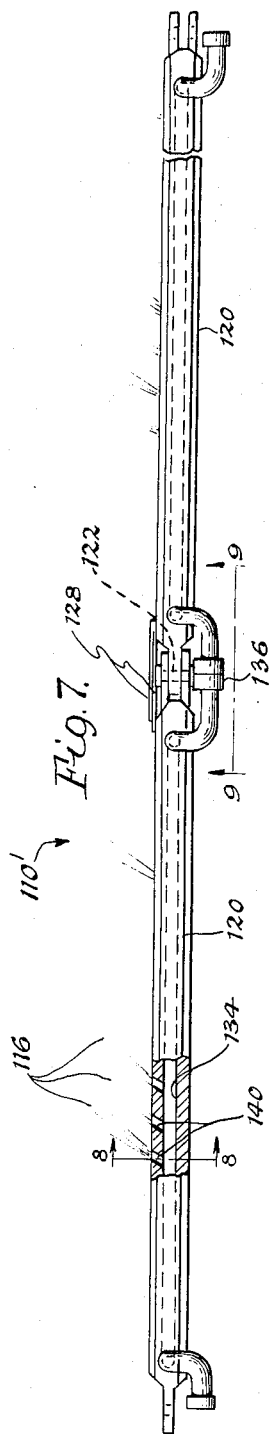
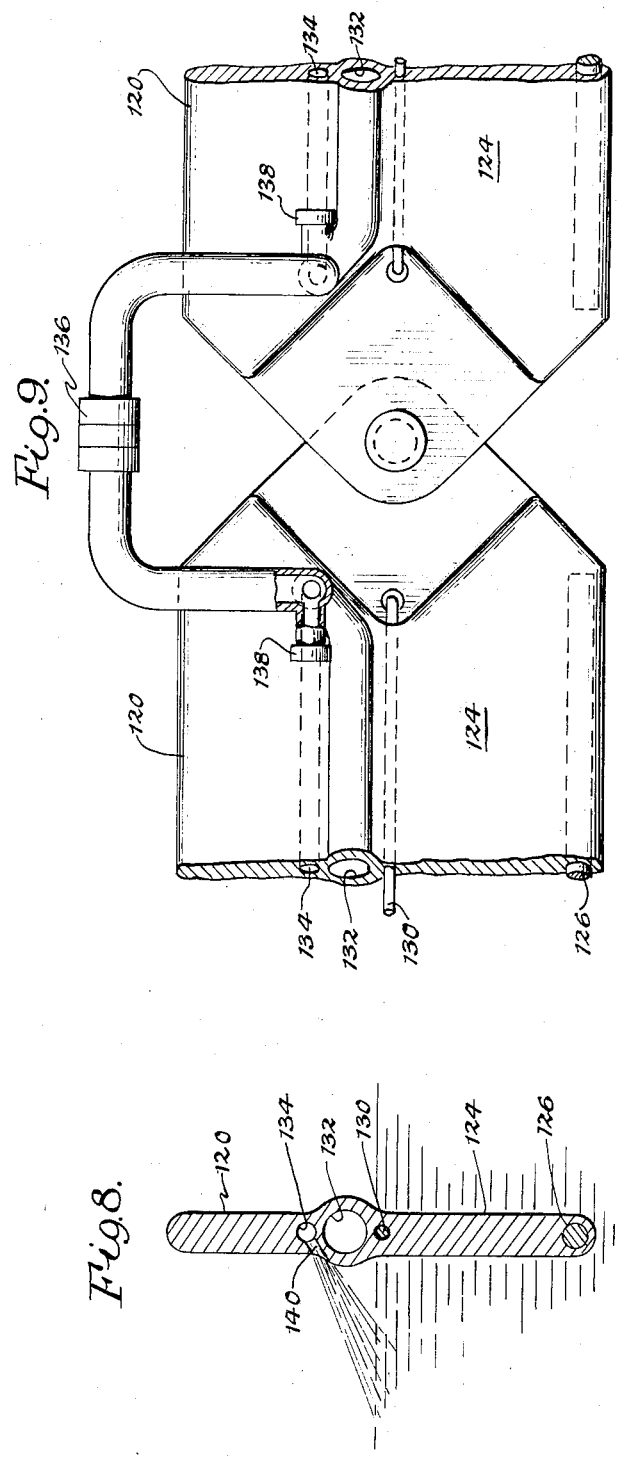

OIL SKIMMER

BACKGROUND OF THE INVENTION

Various types of arrangements have heretofore been proposed for use in "skimming" oil and other floating liquid impurities from the surface of water. On the whole, these arrangements seek to remove a film of oil from the surface of the water by performing the separating or "skimming" operation directly at the oil-film water surface by providing a pick-up conveyor having a surface formed of a material to which oil adheres. However, to be practical from the standpoint of utility in cleaning large bodies of water within any given time, conveyors employed in these arrangements must be driven at such a high rate of speed that emulsion occurs. As a result, large quantities of water are picked up with the oil and the subsequent separation process in a holding tank does not take place quickly. Thus, it is necessary to either provide large-capacity tanks or to interrupt cleaning operations from time to time in order to achieve satisfactory separation. An additional drawback of the present "skimmer" arrangements, of which I am aware, is that they are not readily adapted to simultaneously handle solid-impurities, including for instance bottles, cans and small pieces of driftwood.

SUMMARY OF THE INVENTION

The present invention is directed towards an improved arrangement for removing floating impurities from the surface of a body of water and more particularly to a unit for efficiently removing and separating "liquid" and "solid" impurities from the surface of a body of water.

The unit of the present invention includes a floatation support in the form of a pair of elongated floats or pontoons; a float bridging framework, which defines a liquid impurity component-water separation-holding tank; an impurities-water conveyor, which is pivotally supported adjacent its upper-outlet end on the framework and independently float supported adjacent its lower-inlet end; a pair of floating air-jet booms, which extend in a diverging relation forwardly of the pontoons and serve to sweep floating impurities into the conveyor inlet end; and a perforated solid-impurity components separator-conveyor.

As desired, the liquid and solid impurity components may be transferred to a towed collecting barge.

It is a primary feature of the present invention that the impurities-water conveyor functions to form and thereafter elevate separate charges of impurities and water; each of the charges being formed and subsequently conveyed and separated with a minimum of emulsion inducing agitation. To this end, the impurities-water conveyor includes a plurality of relatively flexible paddle elements, which are carried on an endless belt surface for cooperation with an upwardly inclined generally U-shaped guide channel; the lower end of the channel at which a charge is to be formed being adjustably supported on a float for vertical movement in conformity with changes in the surface of water. The arrangement is such that minimum agitation of the impurities and water is encountered during the charge forming operation at the surface of the water and subsequent transfer along the conveyor. At the outlet end of the conveyor, solid impurities are separated from the oil and water as the latter are admitted to the holding tank; the separated solid impurities being conveyed by means of a perforated conveyor to a convenient collection point and the oil and water quickly separated within the holding tank.

Gravity separation of the oil and water may be assisted by the provision of suitable baffle elements and purging gas, as required.

While the unit of the present invention will be hereinafter described with particular reference to its use in removing both liquid and solid impurities from the surface of water, it will of course be understood that it may be used only for skimming liquid impurities from the surface of a body of water, if desired.

DRAWINGS

The nature and mode of the present invention will now be more fully described in the following detailed description taken with the accompanying drawings, wherein:

FIG. 1 is a perspective view of the water surface cleaning unit of the present invention;

FIG. 2 is a top plan view of the present unit;

FIG. 3 is a sectional view taken generally along line 3—3 in FIG. 2;

FIG. 4 is a sectional view taken generally along line 4—4 in FIG. 2;

FIG. 5 is a sectional view taken generally along line 5—5 in FIG. 2;

FIG. 6 is a sectional view taken generally along line 6—6 in FIG. 5;

FIG. 7 is a top plan view of a boom construction adapted for use with the present invention;

FIG. 8 is a sectional view taken generally along line 8—8 in FIG. 7; and

FIG. 9 is a view taken generally along line 9—9 in FIG. 7.

DETAILED DESCRIPTION

Reference is now made specifically to FIG. 1 of the drawings, wherein the water surface cleaning unit of the present invention is generally designated as 10. Unit 10 generally includes a pair of floats or pontoons 12; a framework for bridging between pontoons 12 and defining a holding tank 16 and workman supporting platform 18; an impurities-water conveyor 20; a perforated separator-conveyor unit 22; and a pair of boom units 24, which bound the intake end of the unit.

Unit 10 is preferably self propelled and self contained by providing a pair of outboard motors 26 and a motor generator for powering conveyors and an air compressor, not shown. Also, unit 10 may include, as required, one or more separable barges 28 for storing separated solid and/or liquid impurity components.

It will be understood that unit 10, as shown in the drawings, is scaled to provide for efficient operations on inland waterways, lakes, bays or the like, wherein maneuverability and/or the ability to effectively clean constricted patches of water surface are important considerations. Where units constructed in accordance with the present invention are intended to be used on large expanses of water, such as the ocean, the unit would of course be scaled upwardly to accommodate for the collection of large quantities of floating impurities. Also, it will be understood that, when the unit is only intended for use in skimming liquid impurities, such as oil, from the surface of water, conveyor unit 22 and barges 28 may be omitted.

Holding tank 16 is best shown in FIGS. 2 and 3 as being of generally rectangular plan-formed configuration and as having a downwardly and rearwardly sloping bottom wall 30. Preferably tank 16 is provided with three or more transversely extending baffle walls 32, which cooperate with each other and the walls of the tank to define a plurality of separating chambers 34a–34. As will be apparent, chambers 34a–34d are of progressively increasing size and are arranged in communication adjacent their top and bottom portions. During operation, the surface of the liquid within tank 16 is preferably maintained at the same level as the surface 36 of the body of water by providing an appropriate number of waterflow through openings, not shown, in bottom wall 30. Perforated tubes 38 may be positioned along bottom wall 30 beneath one or more of chambers 34a–34d for the purpose of directing streams of a purging gas, such as air, upwardly through the liquid contained therein in order to expedite the separating operation. A suitable regulatable pump 40 may be provided to remove gravity-separated oil or other liquid impurities collecting in rearmost chamber 34d for storage in barge 28 or other convenient holding tank, not shown. In this manner, the ratio of water to impurities within the holding tank is maintained within appropriate levels preventing either withdrawal of water through pump 40 or the escape of impurities through the waterflow through openings.

Conveyor 20 is shown in FIGS. 1–6 as including a generally U-shaped guide channel or trough 42 and an endless conveyor device 44 mounted on upstanding guide channel side walls 46. Guide channel 42 is best shown in FIGS. 3 and 5 as being supported adjacent its rear or outlet end on holding tank 16 by means of a shaft 48 for vertical pivotal movement and as being supported adjacent its front or outlet end by a generally U-shaped float element 50. Preferably, shaft 48 is positioned closely adjacent the fore-aft midpoint of unit 10 in order to isolate conveyor 20 from pitching movements of floats 12, while permitting the conveyor to pivot about shaft 48 as determined by wave induced movement of float 50. Suitable adjustment means, shown only in FIG. 1 at 52 may be provided to vertically adjust the inlet end of guide channel 42 relative to float 50 in order to control the amount of impurities and water comprising a charge to be formed by the conveyor in the manner to be hereinafter described.

Referring particularly to FIG. 5, it will be seen that the bottom wall of guide channel 42 is formed with a sharply curved entrance lip portion 54; relatively inclined intermediate bottom wall portions 56 and 58; and a curved exit lip portion 60, which is arranged relative to shaft 48 so as to prevent binding thereof with a stationary inverted V-shaped end plate construction 62, during pivotal movement of conveyor 20. End plate 62 may be considered to be part of conveyor unit 22, to be hereinafter more completely described. Preferably, guide channel 42 is adjusted relative to float 50, such that the junction of portions 56 and 58 is arranged closely adjacent water surface 36.

Conveyor device 44 is best shown in FIGS. 4–6 as including an endless belt 70, which is trained about segmented drive and idler rolls 72 and 74, respectively; a plurality of relatively flexible paddle elements 76, which are fixed in spaced relationship along belt 70 by pairs of mounting devices 78a, 78b; and a pair of cam elements 80a, 80b, which cooperate with mounting devices 78a, 78b for the purpose of orienting paddle elements 76 relative to belt 70. Drive roller 72 may be powered by any suitable means such as an electric motor 82 and variable speed reducer, not shown, accessible from platform 18.

By referring to FIGS. 4 and 5, it will be understood that mounting devices 78a, 78b each include a pair of generally L-shaped brackets 84a, 84b, which are arranged to extend through belt apertures 86a, 86b and are pivotally supported adjacent their mid points or apexes by transversely extending belt carried rods 88. The outwardly disposed legs of each pair of brackets 84a, 84b are suitably affixed 76 being forced to move the rear surface of a single paddle element 76, whereas the inwardly disposed legs thereof are aligned for engagement with cam elements 80a, 80b, respectively. As will be apparent from viewing FIG. 5, cam elements 80a, 80b are so arranged that they serve to force the inwardly disposed legs of successive pairs of brackets to lie against the inner surface of belt 70 during passage from adjacent roll 44 towards roll 42. This results in the outer edge of paddle elements 16 being forced to move in sliding engagement successively with guide channel portions 56, 58 and end plate 62. By terminating cam elements 80a, 80b adjacent roll 72, the paddle elements are again freed for movement relative to the surface of belt 70; this facilitating removal of oil or other impurities from their "pushing" surfaces by a scraping blade device 90. The size of guide channel 42, and the size and spacing between paddle elements 76 will depend upon operating conditions for which any given unit is designed.

Unit 22 is best shown in FIGS. 1–3 as including, in addition to end plate 62, a conveyor unit 94 having a perforated belt 96, which is trained about drive roller 98 and idler rollers 100, such that liquids are free to drain from the solid impurities into tank 16 as such solid impurities are transferred to barge 28. If desired, drive roller 98 may be drivingly connected to motor 82 by chain drive 102.

Again referring to FIGS. 1–3, it will be seen that boom units 24 each include inner end portions and outer end portions 110 and 112, respectively. Each end portion 110 is movably carried adjacent opposite ends thereof on one of floats 12 and one of guide channel side walls 46, such as to permit free vertical movement of the inlet end of conveyor 20 relative to such floats. Each of end portions 112 is hingedly supported on one of floats 12, such that they may be swung vertically from their normal operative position illustrated in the drawings into a vertically upstanding position, thereby to decrease the overall length of unit 10 and facilitate docking and/or other maneuvering thereof. Also, end portions 112 are preferably supported for horizontal swinging movement, so as to permit an operator to vary the effective operating width of the unit as required by the thickness of the floating impurities or to provide for the clearance of obstacles.

Boom units 24 are supplied with air or other suitable fluid under pressure from a suitable source including supply conduit 114, and are constructed such that the pressurized air is directed over the water surface 36 in the form of a plurality of jets 116. As will be apparent from viewing FIG. 2, jets 116 are directed inwardly and rearwardly so as to channel or sweep floating impurities rearwardly into the inlet end or mouth of conveyor 20, while at the same time tending to prevent buildup of impurities on the facing surfaces of their respective boom units.

A modified form of the outer end portion of boom unit 24 is designated as 110' and illustrated in FIGS. 7–9. End portion 110' is best shown in FIG. 7 as including a plurality of floatable boom segments 120, which are hingedly interconnected by removable pin shaft 122. By this arrangement, numbers of individual segments 120 may be joined together to form a boom of any desired length, and the individual segments permitted to move relative to one another and their end supporting floats 12 to accommodate for wave induced changes in water surface 36. Since segments 120 are preferably formed of a readily floatable material such as a plastic foam, each is necessarily provided with a depending skirt portion 124, which is weighted as at 126 to insure against the segment "popping" up out of the water, such as would permit the escape of impurities therebeneath. The joint between a pair of adjacent segments is preferably sealed by segment end supported, overlapping seal flaps 128. Also, segments 120 are preferably provided with a lengthwise extending reinforcing wire or cable 130 to prevent them from being pulled apart under service conditions.

In the arrangement illustrated, each of segments 120 is provided with a primary or distributing air conduit 132 and a secondary air conduit 134; conduits 132 of adjacent segments being coupled together by quick disconnect fittings 136. Conduits 134 are connected into conduits 132 by pressure reducing valves 138 and are formed with a plurality of spaced orifices 140, which serve to produce jets 116.

When it is desired to initiate a water surface skimming operation, boom units 24 are placed in the water and swung apart as required; jets 116 established; and operation of conveyors 44 and 94 initiated. Of course, conveyor 94 may be permitted to remain idle or dispensed with if only a liquid impurity, such as an oil film, is required to be skimmed from the water surface 36.

Forward movement of unit 10, coupled with the sweeping action of jets 116, serves to channel floating impurities towards the mouth end of conveyor unit 20; impurities tending to become more concentrated and/or of increased thickness as the channeling action continues. As the impurities reach conveyor unit 20, they together with water on which they are supported, tend to flow into guide channel 42 behind paddle element, i.e., paddle element 76a. As paddle element 76a is moved upwardly along bottom wall portion 56, impurities and water are permitted to flow into guide channel 42 until a following paddle element 76b, is moved into engagement with bottom wall portion 56 immediately adjacent entrance lip 54 and paddle element 76a is moved into its primed position illustrated in FIG. 5. At this point, there is established a "charge" of floating impurities and water, which is bounded by guide channel 42 and paddle elements 76a and 76b; the charge being formed and subsequently conveyed toward the outlet end of unit 20 with a minimum of emulsion inducing agitation. At this point, it should be noted that by providing entrance lip 54 with a small radius of curvature, by bringing successive paddle elements into engagement with bottom wall portion 56 immediately adjacent such lip, and by supporting the forward end of guide channel 42 on float 50, there is little or no tendency for impurities and water to slash or flow in and out of the entrance to guide channel 42 during a charge forming operation, even under rough weather conditions.

Also, it will be noted that by steeply inclining bottom wall portion 58, the formed charge may be transferred to a point above tank 16 without requiring the provision of an undesirably long guide channel.

As a charge approaches the outlet end of guide channel 42, liquid impurities and water may escape through the gap or spacing between lip portion 60 and end plate 62 and be smoothly guided by the former downwardly onto the surface of the liquid in tank 16 with a minimum of emulsion inducing agitation. Preferably, a suitable grating, not shown, would be provided over the gap. After this initial separation of liquids from any solid impurities present in the charge, the solid impurities are forced to move upwardly over end plate 62 and thereafter permitted to slide downwardly onto conveyor belt 96. Subsequent transfer of the solid impurities by belt 96 permits liquids to drip or drain, or even be washed therefrom, thereby to complete the solids-liquids separating operation.

As an alternative construction, a very small gap opening would be provided between lip 60 and end plate 62 in order to prevent lodgement of any solid impurities therewithin. In this case, at least the downwardly and rearwardly sloping surface of end plate construction 62 would be preferably apertured to initiate liquids-solids separation and/or separation would be completed by flowing a charge onto the surface of belt 96. While liquids-solids separation may be more efficiently performed with the use of this alternative construction, greater agitations will likely be encountered.

As indicated above, gravity induced separation is carried on within tank 16 and aided, as required, by the provision of purging gas jets arranged within one or more of chambers 34a–34d. The time required to obtain acceptable separation is reduced to a minimum, due to the fact that conveyor unit 20 is operable to pick up and convey charges of impurities and water; effect initial separation of liquid impurities and water from the solid impurities and finally deposit liquid impurities and water in tank 16 all with a minimum of emulsion inducing agitation.

I claim:

1. A unit for cleaning floating impurities from the surface of a body of water when an intake end of said unit is movable in a direction relatively towards said impurities, said unit comprising in combination:

unit supporting means including a pair of transversely spaced float means;

framework means mounted on and extending between said float means, said framework means including tank means for receiving and effecting gravity separation of liquid components of said impurities and water;

means for collecting floating impurities adjacent said intake end of said unit and including a pair of boom units having inner and outer portions;

an impurity-water conveyor means arranged intermediate said float means for continuously forming separate charges of said collected floating impurities and water adjacent an inlet end thereof and for conveying said charges to a position above said tank means adjacent an outlet end thereof, said outlet end being supported by said framework means for vertical pivotal movements about a single axis extending transversely between said float means, said inlet end being supported by separate float means to rise and fall with the surface of said body of water whereby to effect pivotal movements of said conveyor means relative to said framework means about said axis, said outer portions of said boom units being end connected one to each of said float means and extending therefrom in a diverging manner forwardly of said unit intake end, said inner portions of said boom units extending one between each of said float means and one side of said conveyor means adjacent said inlet end thereof, said inner portions being movably end connected to said float means and said conveyor means to permit relative vertical movement therebetween, and at least said outer portions of said boom units having means for establishing a plurality of pressurized fluid water surface sweeping jets arranged in spaced relationship lengthwise thereof, said jets being directed inwardly and rearwardly towards said inlet end of said conveyor means whereby to simultaneously sweep impurities towards said inlet end of said conveyor means and tend to prevent buildup of said impurities on facing surfaces of said outer portions;

means for receiving solid components of said impurities; and means cooperating with said impurity-water conveyor means for separating liquid impurity components and water from solid impurity components of conveyed charges for gravity discharge into said tank means and for transferring said solid impurity components of said conveyed charges to said receiving means.

2. A unit according to claim 1, wherein said outer portions each comprise at least two boom segments hingedly joined together for relative vertical pivotal movement, each of said boom segments being formed with a depending skirt portion and lengthwise extending end mounted flap means, said flap means of adjacent segments being arranged in overlapping relation when said adjacent segments are joined together for affording a liquid seal between said adjacent segments.

3. A unit for cleaning at least liquid floating impurities from the surface of a body of water when an intake end of said unit is movable in a direction relatively towards said impurities, said unit comprising in combination:

unit supporting float means;

framework means mounted on said float means, said framework means including tank means for receiving and effecting gravity separation of said liquid impurities and water; and a liquid-impurity-water conveyor means for continuously forming separate charges of said floating liquid impurities and water adjacent said intake end and for conveying said charges for gravity discharge into said tank means, said conveyor means including a generally U-shaped guide channel having a bottom wall and vertically standing side walls and an endless conveyor having a plurality of paddle elements spaced therealong, said guide channel bottom wall having a downwardly and forwardly curved entrance lip, a relatively gradually inclined bottom wall portion extending upwardly and rearwardly from said entrance lip and a relatively steeply inclined bottom wall portion extending upwardly and rearwardly from said gradually inclined bottom wall portion, adjacent paddle elements when movable along said guide channel bottom wall cooperating therewith and said side walls to form and convey said charges, each of said paddle elements being moved by said endless conveyor into initial engagement with said gradually inclined bottom wall portion immediately adjacent said entrance lip, said paddle elements being relatively spaced one from another along said endless conveyor whereby when one of said paddle elements initially engages said gradually inclined bottom wall portion as aforesaid a preceding paddle element engages said bottom wall adjacent the juncture of said bottom wall portions, said guide channel having a forward end thereof float supported to rise and fall with the surface of said water to position said juncture of said bottom wall portions closely adjacent the surface of said body of water, and said guide channel having a rearward end thereof supported by said framework means for vertical pivotal movement about an axis extending transversely of said direction and to position an upper rearwardly disposed end of said steeply inclining bottom wall portion in overlying relation to said tank means.

4. A unit according to claim 3, wherein said paddle elements are formed of a flexible material; said axis is disposed adjacent a fore-aft midpoint of said float means; said upper rearwardly disposed end is curved to extend rearwardly and downwardly about said axis whereby to direct liquid impurity components and water downwardly into said tank means with a minimum of emulsion inducing agitation; and said endless conveyor is an endless belt trained about roll supports arranged one adjacent each of said forward and rearward ends of said guide channel and includes cam means extending between said roll supports and arranged relatively inwardly of a run of said endless belt disposed adjacent said guide channel, said cam means having portions thereof arranged essentially parallel to said bottom wall portions, said paddle elements are hingedly supported on said endless belt for movement about parallel axes extending transversely of said direction by mounting devices extending through said endless belt, said mounting devices cooperating with said cam means portions to maintain said paddle elements in an upstanding relationship relative to said endless belt and said bottom wall portions during passage along said run and scraper means are arranged to surface engage said paddle elements during passage thereof downstream of said cam means about the one of said roll supports arranged adjacent said rearward end of said guide channel.

5. A unit for cleaning floating impurities from the surface of a body of water when an intake end of said unit is movable in a direction relatively towards said impurities, said unit comprising in combination:

unit supporting float means;

framework means mounted on said float means, said framework means including tank means for receiving and effecting gravity separation of liquid components of said impurities and water;

means for collecting floating impurities adjacent said intake end of said unit;

an impurity-water conveyor means for continuously forming separate charges of said collected floating impurities and water adjacent said intake end and for conveying said charges to a position above said tank means, said conveyor means including a generally U-shaped guide channel having a bottom wall and vertically standing side walls and an endless conveyor having a plurality of paddle elements spaced therealong, adjacent paddle elements when movable along said guide channel bottom wall cooperating therewith and said side walls to form and convey said charges, said guide channel having a forward end thereof separately float supported to rise and fall with the surface of said water while arranging a forward end of said bottom wall beneath said surface, said guide channel having a rearward end thereof supported by said framework means for vertical pivotal movement about a single axis extending transversely of said direction and to position a rearward end of said bottom wall in overlying relation to said tank means, said rearward end of said bottom wall defining an exit lip portion, and said side walls extending rearwardly of said exit lip portion;

means for receiving solid components of said impurities, said receiving means being arranged rearwardly of said tank means; and means cooperating with said impurity-water conveyor means for separating liquid impurity components and water from solid impurity components of conveyed charges for gravity discharge into said tank means and for transferring said solid impurity components of said conveyed charges to said receiving means, said cooperating means including a stationary plate fixed to said framework means immediately adjacent said exit lip portion intermediate said side walls, said exit lip portion being curved to extend downwardly and rearwardly about said axis whereby to direct liquid impurity components and water downwardly into said tank means with a minimum of emulsion inducing agitation while maintaining said exit lip portion in closed proximity to said plate during pivotal movements of said guide channel to prevent passage of solid impurity components therebetween, said paddle elements being operable to push solid impurity components from said rearward end of said guide channel bottom wall onto said plate for gravity discharge therefrom, and said cooperating means additionally includes perforated endless conveyor means arranged to receive solid impurity components gravity discharged from said plate and for conveying discharged solid impurity components in an overlying relationship to said tank means for discharge into said receiving means, said perforated conveyor means permitting drip separation of liquid impurity components and water from discharged solid impurity components into said tank means.

6. A unit according to claim 5, wherein said forward end of said guide channel bottom wall includes a downwardly and forwardly curved entrance lip and a relatively gradually inclined bottom wall portion extending upwardly and rearwardly from said entrance lip, said gradually inclined bottom wall portion being connected to said exit lip portion by a relatively steeply inclined bottom wall portion, each of said paddle elements being moved by said endless conveyor into initial engagement with said gradually inclined bottom wall portion immediately adjacent said entrance lip and said paddle elements being relatively spaced one from another along said endless conveyor whereby when one of said paddle elements initially engages said gradually inclined bottom wall portion as aforesaid a preceding paddle element engages said bottom wall adjacent the juncture of said bottom wall portions.

* * * * *